No. 819,317. PATENTED MAY 1, 1906.
J. E. SHREWSBURY.
SUBMARINE OBSERVATION TOWER.
APPLICATION FILED MAY 26, 1905.
2 SHEETS—SHEET 1.
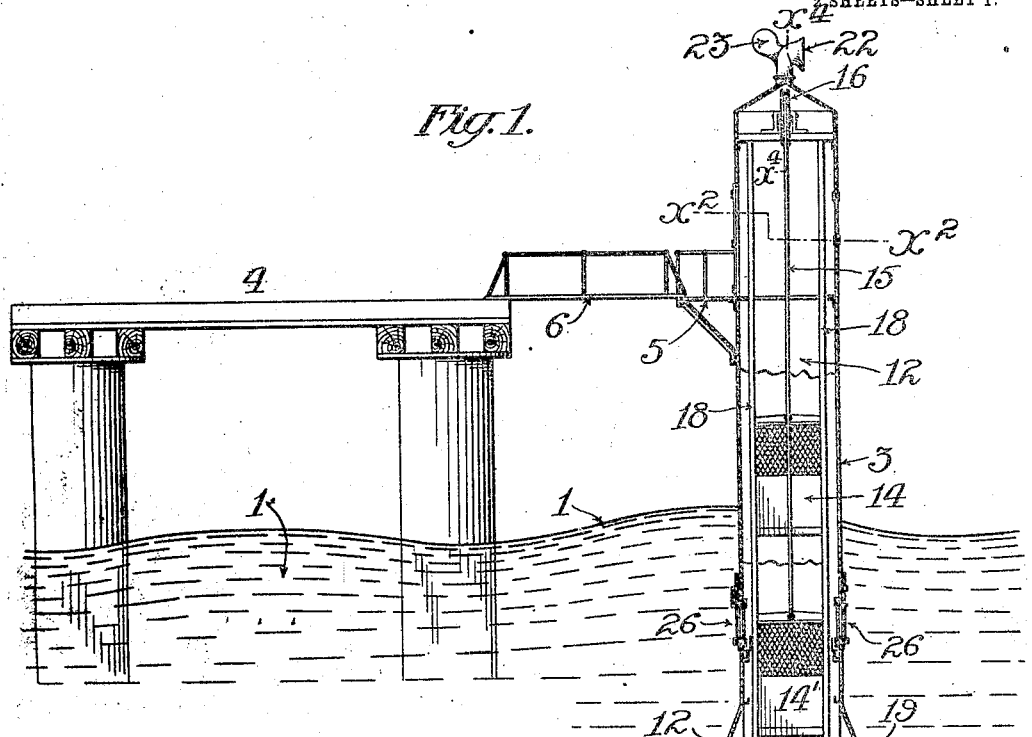
Fig. 1.
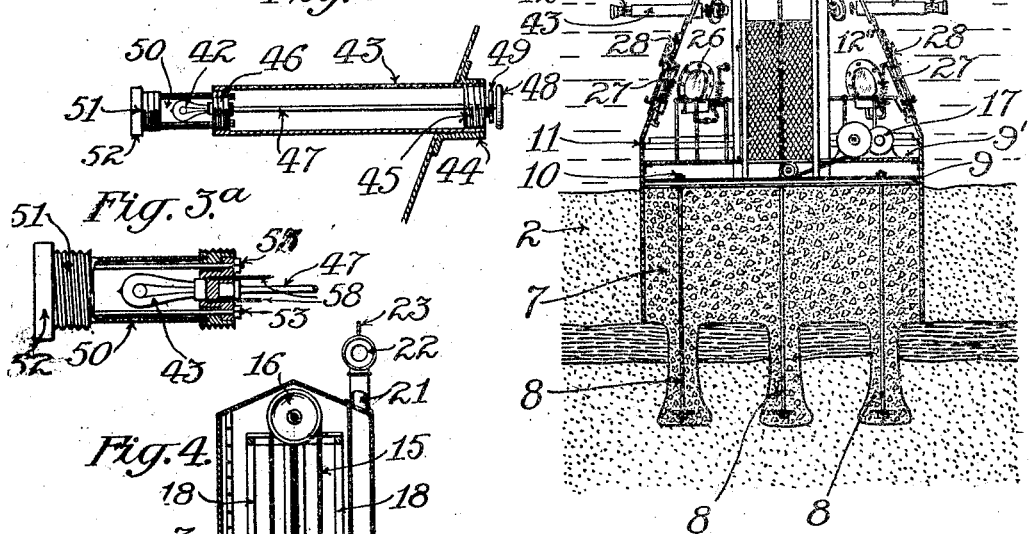
Fig. 3.
Fig. 3a.
Fig. 4.
Witnesses:
Frank L. Abraham
A. P. Knight
Inventor,
Joseph E. Shrewsbury
by Townsend Bro
his attys No. 819,317. PATENTED MAY 1, 1906.
J. E. SHREWSBURY.
SUBMARINE OBSERVATION TOWER.
APPLICATION FILED MAY 26, 1905.
2 SHEETS—SHEET 2.
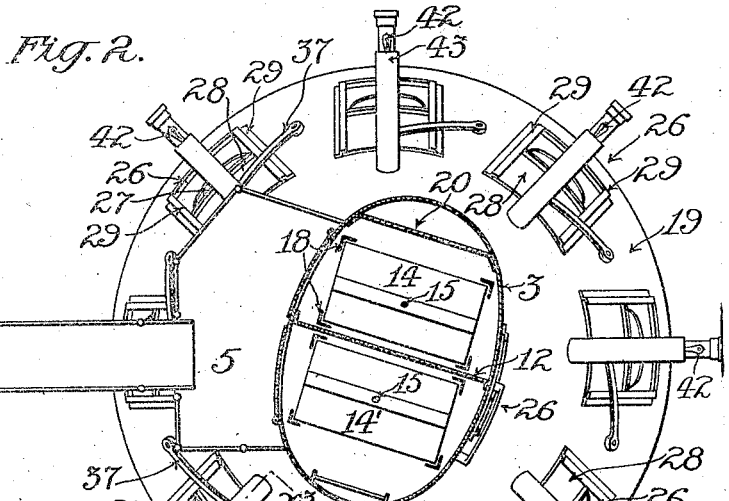
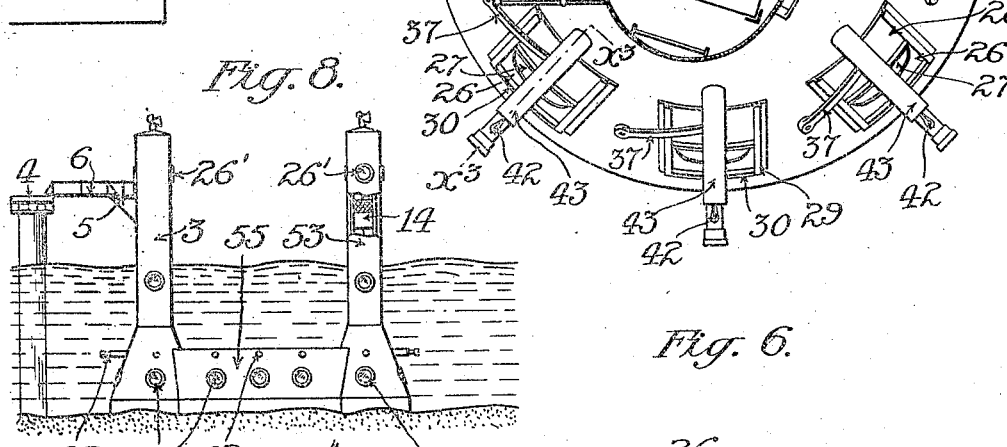
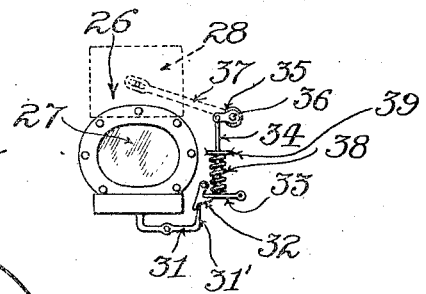
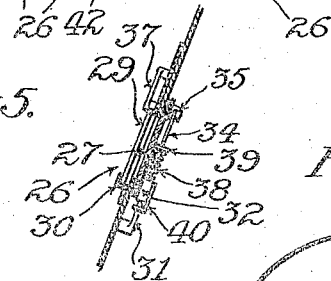
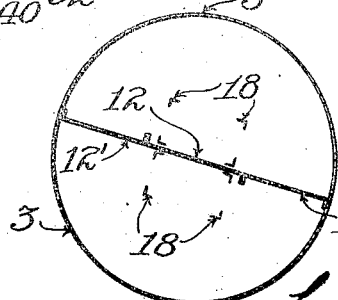
Witnesses:
Frank L. A. Graham
A. P. Knight
Inventor,
Joseph E. Shrewsbury
by Townsend Bro
his Attys.

UNITED STATES PATENT OFFICE.

JOSEPH E. SHREWSBURY, OF LONGBEACH, CALIFORNIA, ASSIGNOR OF ONE-HALF TO HENRY MacDAVENPORT, OF LOS ANGELES, CALIFORNIA.

SUBMARINE OBSERVATION-TOWER.

No. 819,317.     Specification of Letters Patent.     Patented May 1, 1906.

Application filed May 26, 1905. Serial No. 262,311.

*To all whom it may concern:*

Be it known that I, JOSEPH E. SHREWSBURY, a citizen of the United States, residing at Longbeach, in the county of Los Angeles and State of California, have invented a new and useful Submarine Observation-Tower, of which the following is a specification.

The main object of this invention is to provide means whereby access can be had from the surface of a body of water to the bed or lower part of such body of water, thus enabling inspection or observation of the water and contents thereof at depths beyond the range of vision of persons at the surface.

The invention is intended, primarily, as an amusement or entertainment apparatus and may be applied at seaside or lakeside resorts for the purpose of enabling persons to observe marine life or growths or forms at the bottom or below the surface of a body of water.

A further object of the invention is to provide a strong and durable construction for the purpose stated.

Another object of the invention is to provide a construction that can be readily attached or secured in place at any desired location and can be moved from one location to another.

Another object of the invention is to provide means for illumination of the water to extend the range of observation.

The invention comprises a tower extending from the bed or floor of the body of water to and above the surface thereof, said tower being provided with ports or windows closed with glass to enable persons within the tower to see the water; and the invention further comprises means for automatic closure or shutting of the port-openings in case of breakage of the glass therein.

The invention further comprises features and details hereinafter described.

The accompanying drawings illustrate the invention.

Figure 1 is a vertical section of the apparatus. Fig. 2 is a horizontal section on the line $X^2 X^2$, Fig. 1. Fig. 3 is a detail section on the line $X^3 X^3$, Fig. 2. Fig. $3^a$ is an enlargement of part of Fig. 3. Fig. 4 is a detail section on the line $X^4 X^4$ in Fig. 1. Fig. 5 is a vertical section of one of the port-holes or windows with closure devices therefor. Fig. 6 is an inside view thereof. Fig. 7 is a horizontal section of the lower part of the tower, showing a transverse partition used temporarily when the tower is being put in place. Fig. 8 is an elevation of an embodiment of the invention including a submarine tunnel and a plurality of towers communicating through the tunnel.

1 designates a body of water, and 2 the bed or floor thereof. 3 designates the tower, which rests on the bed 2 and extends upwardly above the surface of the water. Said tower is desirably located near a pier or wharf, such as is generally found at resorts where a tower of this character would be applied, such a pier being indicated at 4. The tower may have a landing 5, connected to the wharf or pier 3 by a bridge or gangway 6.

A suitable foundation is preferably provided in and on the bed 2 to support the tower, such foundation (indicated at 7) being formed, for example, of concrete having vertical tie or lag bolts 8.

The tower 3 has a base or floor 9, fastened to said tie-bolts by nuts 10, the said base and the side walls 11 of the tower being watertight, so that the interior of the tower forms a water-tight chamber. The cubical content of this chamber or the portion thereof below the water-level will in general have a flotative capacity considerably in excess of the weight of the structure, and the latter is held down through the bolts 8 and nuts 10 aforesaid by the weight of the foundation 7.

In order to sink the structure into position, it is preferable to provide for partial temporary filling of the structure with water during the sinking operation, and for this purpose the tower may be divided by a central transverse partition 12, extending from the bottom of the tower above the water-level and preferably to the extreme top of the tower. The lower part of this partition may have removable portions 12', (see Fig. 7,) which are detachably bolted to the main partition 12, so that it can be fastened temporarily in place while the tower is being sunk. On filling one half or side of the tower with water this flotation will be overcome, and the tower can be lowered into place, the material dug out on the "dry" side, and a concrete foundation filled in with inserted lag-bolts 9.

The bottom of the tower can be fastened to the foundation by nuts 10, and the water can then be pumped out of the other side, which can then be filled at the bottom with concrete and fastened down in a similar manner. After this is done the doors or removable parts 12' can be moved aside or removed altogether from the tower, openings 12'' giving free communication between the two sides at the bottom of the tower. The side wall 11 of the tower extends below the floor 9 to form a caisson or boxing for the concrete filling. A false bottom or floor 9' can be provided along the base 9 to serve as a promenade and landing.

Suitable means are provided for facilitating access or transit from the top to the bottom of the tower, or vice versa, said means consisting, for example, of elevators. 14 14' designate two elevator-cages suspended from and operated by a cable 15, running over a pulley 16 at the top of the tower and operated by a motor 17, which may be located in any suitable situation—for example, at the bottom of the tower. The cages 14 14' work in elevator-shafts 18, formed on opposite sides of the central partition 12 and provided with landing or means of access at the top and bottom of the tower.

The bottom or lower end of the tower may be outwardly flared or more or less conical in shape, as shown at 19, the tower proper extending upwardly from this conical lower portion in the form of an upright tubular structure, which in order to accommodate the two elevators may have a general elliptical shape, the partition 12 extending transversely across the ellipse on the line of the short diameter thereof, so as to act as a brace in addition to its function above specified. The space at one side of the tubular shaft may be set apart by a subpartition 20, extending from the top of the tower to the lower portion thereof, this space being open at its lower end into the lower portion of the tower and being closed at its upper end with the exception of an intake 21, having a funnel 22 pivotally mounted thereon and provided with a vane 23 for operation by the wind, so that a current of air will be forced through the funnel and down the space aforesaid into the bottom of the tower to renew the supply of air therein, the foul air displaced by this fresh air being forced up through the main part of the tower.

26 designates port-holes or windows located at suitable places in the tower—for example, in the conical lower portion and in the tubular portion aforesaid—said port-holes being provided with transparent or glass plates 27 to enable persons standing within the tower to look out into the water, the port-holes in the upper or intermediate parts of the tower being for the purpose of enabling such observation to be made while ascending or descending in the elevators and the port-holes in the lower portion of the tower being for the purpose of enabling observation by persons who have descended to the bottom of the tower.

In order to prevent risk of filling the tower with water in case of breakage of the glass in any of the port-holes, each of the latter is preferably provided with a protective device consisting, for example, of a shutter 28, slidably mounted in guides 29 on the outside of the tower structure and normally held in position above and clear of the glass, but adapted to be automatically released on breakage of the glass in the port-hole to enable it to fall into position in front of the glass and cut off the inflow of water.

30 designates a flange or projection to limit the downward movement of the shutter.

The automatic means for release of the shutter may consist of a trip-lever 31, pivotally mounted on the inside of the tower and having an arm or projection 31' engaging a dog 32, normally held in position to catch under a pivoted arm 33, connected by a rod 34 to an arm 35 on rock-shaft 36, extending through the wall of the tower and provided on the outside of the tower with an arm 37, pivotally connected with the shutter 28 aforesaid. A spring 38, engaging with the arm 36 and with a fixed bracket 39, supplements the action of gravity in depressing the shutter. The trip-lever 31 is provided with a shelf, trough, or ledge 40, located below and in front of the port in such manner that when the glass in said port is broken the inrushing water will strike said ledge and tip the said lever to cause disengagement of the dog 32 from arm 33, whereupon the shutter will be released and will fall to closed position.

42 designates lights or lamps, preferably electric, for illuminating the water outside of the tower, such lamps being preferably mounted in such manner that they can be withdrawn into the body of the tower for protection or for cleaning. The holder or support for each lamp comprises a tube 43, extending outwardly from the tower and screwed in collars 44, fastened on the wall of the tower, said tube being screw-threaded internally of its inner and outer ends to receive screw-plugs 45 46. A rod 47 extends through plug 45 and is attached at its outer end to plug 46, said rod being provided at its inner end with a hand-wheel 48, whereby it may be rotated to screw the plug 46. A stuffing-box 49 may be provided where the rod 47 extends through the plug 45. Lamp 42 is carried by a plug 46, and said plug also preferably carries a glass case or lantern 50, surrounding the lamp 42, the outer end of such lantern being closed by a screw-plug 51, adapted to screw into the screw-plug at the outer end of the plug 43 and having a flange or head 52 to bear against the outer end of said tube to make a tight joint. When the lamp is to be withdrawn or retracted—for example, in case of danger from a storm or in case the lamp has to be cleaned or renewed—handle 48 is operated to screw the plug 46 inwardly out of the engagement with the screw-thread at the outer end of the tube 47 and to screw the plug 51 into tight engagement with the outer end of the tube 47, thereby sealing the tube. In case it is desired to remove the lamp the screw-plug 45 is withdrawn from the tube 47, and by means of suitable long-handled socket-wrenches the bolts 53 are loosened and the rod 47 withdrawn from the tube, together with the screw-plug 46 and the lamp carried thereby.

Lamps 42 are preferably electric lamps, supplied with current through leads 58, extending down through the tower.

The tower forms in itself a water-tight chamber or vessel which can be floated and towed to the desired position and then sunk and secured in place as above described.

If at any time it is desired to change the location of the tower, it is only necessary to release the fastenings 10, whereupon the tower will rise to the surface and can be towed to a new location and fastened thereat by means above described, the only waste of material being the foundation.

The invention may be carried out in various ways, according to the local requirements. In the embodiment shown in Fig. 7 a lateral extension or submarine tunnel 55 is provided, extending from and communicating with the lower part of tower 3, and a tower 53 is provided, extending upwardly from this tunnel. The tunnel 55, as well as towers 3 and 53, may be provided with glassed port-holes or windows 26 and with illuminating means 42. The tower 53 is of similar construction to tower 3 and may be provided with similar elevator means 14. Each of the towers may have windows 26' above the water-level for observation.

What I claim is—

1. A fixed submarine observation-tower attached to a submarine bed and extending from said bed to and above the level of the water and having observation-openings provided with transparent closures.

2. A fixed submarine observation-tower attached to a submarine bed and extending above and below the water-level and provided below the water with observation-openings having transparent closures and with illuminating means exteriorly of the tower, said illuminating means consisting of electric lamps and supply connections extending through the tower to said lamps.

3. A fixed submarine observation-tower attached to a submarine bed and extending above and below the water-level and provided below the water with observation-openings having transparent closures and with illuminating means exteriorly of the tower below the water-level, and projecting supports for said illuminating means extending outwardly from the tower.

4. A submarine observation-tower extending below and above the water-level and provided below the water-level with observation-openings, having transparent closures with illuminating means exteriorly of the tower and retractile supports for said illuminating means.

5. A submarine observation-tower extending below and above the water-level and provided below the surface of the water with observation-openings and with illuminating means exteriorly of the tower and a movable closure for the illuminating means.

6. A fixed submarine observation-tower attached to a submarine bed extending above and below the water-level and being provided with observation-openings below the water-level and with illuminating means above and below the water exteriorly of the tower and a removable support for the illuminating means.

7. A submarine observation-tower extending below and above the water-level and provided with observation-openings below the water-level, and elevator means working within the tower and provided with means of access thereto at the top and bottom of the tower.

8. A fixed submarine observation-tower formed as a water-tight vessel and provided at its bottom with foundation-attaching means in combination with a submarine foundation on which the tower is fastened by said attaching means.

9. A submarine observation-tower formed as a water-tight vessel and provided at its bottom with a depending caisson-flange and with means for attachment to a foundation.

10. A submarine observation-tower extending below and above the water-level and having a partition extending vertically therein.

11. A submarine observation-tower extending below and above the water-level and having a vertical partition with openings at its lower portion and removable closures for said openings.

12. A fixed submarine observation-tower attached to a submarine bed extending below and above the water-level and provided with observation-openings, a ventilating-duct in the tower extending from above to below the water-level and means for supplying air through said duct.

13. A submarine observation-tower extending below and above the water-level and provided below the water with observation-openings and glass closures for said openings and shutters for said openings.

14. A submarine observation-tower extending below and above the water-level and provided below the water-level with observation-openings, and glass closures for said openings, shutters for said openings and means for automatically closing the said shutters on breakage of the glass closures.

15. A submarine observation-tower extending below and above the water-level and provided below the water-level with observation-openings and glass closures for said openings, shutters for said openings and means for automatically closing the said shutters on breakage of the glass closure, said means comprising a trip device located in a path of inflowing water, from said opening and controlling the movement of said shutters.

16. A submarine observation-tower provided with a laterally-extending tunnel having observation-openings with transparent closures.

17. A submarine observation-tower provided with a laterally-extending tunnel and another tower extending upwardly from said tunnel and having observation-openings with transparent closures.

In testimony whereof I have hereunto set my hand, at Longbeach, California, this 5th day of May, 1905.

JOSEPH E. SHREWSBURY.

In presence of—
WILLIAM S. STEVENS,
BERTHA HILLARY.